United States Patent

Littlehorn

[11] Patent Number: 6,042,448
[45] Date of Patent: Mar. 28, 2000

[54] BALLOON VALVE AND METHOD OF PRODUCING

[75] Inventor: Michael J. Littlehorn, Golden, Colo.

[73] Assignee: Pro-Pak Industries, Inc., Lakewood, Colo.

[21] Appl. No.: 09/327,163

[22] Filed: Jun. 9, 1999

Related U.S. Application Data

[62] Division of application No. 08/775,219, Dec. 31, 1996, Pat. No. 5,934,310.

[51] Int. Cl.[7] .................................................. A63H 27/10
[52] U.S. Cl. .......................... 446/220; 446/224; 137/223; 137/844
[58] Field of Search ................................... 446/220, 221, 446/222, 223, 224, 225, 226; 137/223, 246, 844, 846, 847, 848

[56] References Cited

U.S. PATENT DOCUMENTS

| | | | |
|---|---|---|---|
| 1,625,394 | 4/1927 | Roberts | 446/224 |
| 3,230,663 | 1/1966 | Shabram | 446/220 |
| 4,674,532 | 6/1987 | Koyanagi . | |
| 4,842,007 | 6/1989 | Kurtz . | |
| 4,917,646 | 4/1990 | Kieves . | |
| 5,188,558 | 2/1993 | Barton et al. . | |
| 5,248,275 | 9/1993 | McGrath | 446/224 |
| 5,295,892 | 5/1994 | Felton . | |
| 5,378,299 | 1/1995 | McGrath et al. . | |
| 5,405,479 | 4/1995 | Anderson | 446/224 |
| 5,451,179 | 9/1995 | Laroi, Jr. et al. . | |
| 5,456,716 | 10/1995 | Iversen et al. . | |
| 5,482,492 | 1/1996 | Becker . | |
| 5,540,500 | 7/1996 | Tanaka . | |
| 5,595,521 | 1/1997 | Becker . | |
| 5,733,406 | 3/1998 | Knight | 446/224 |
| 5,795,211 | 8/1998 | Carignan et al. | 446/220 |
| 5,860,441 | 1/1999 | Garcia | 137/223 |
| 5,934,310 | 8/1999 | Littlehorn | 137/223 |

OTHER PUBLICATIONS

Duschene, Stephanie, "The Sky's the Limit for Premier Balloonmaker," Converting Magazine, Jan. 1997.

(List continued on next page.)

*Primary Examiner*—Sam Rimell
*Attorney, Agent, or Firm*—Holland & Hart LLP

[57] ABSTRACT

An inventive valve member, and associated method of making, for use in a bag for holding a gas or liquid, the bag including a main body having a stem portion, the main body defining an interior space and formed from a front and back sheet sealed together about a peripheral edge. The stem defines an inlet aperture at a free end thereof. A valve member has a width dimension positioned in the stem for use in inflating the main body, the valve member including a flexible front layer and a flexible back layer. The front layer is adjacent to the front sheet, and the back layer is adjacent to the back sheet. Both the front and back layers define opposing elongated edges. The front and back layers are attached together along the elongated sides to form a seal. The valve member has an inlet end and an outlet end, the inlet end is adjacent to the inlet aperture, and the outlet end is positioned in communication with the interior chamber of the main body. A front valve seal is formed between the top layer of the valve member and the top sheet of the stem portion. The top valve seal is positioned adjacent to the inlet end of the valve member, the front valve seal extending substantially perpendicularly from the longitudinal edges of the valve member and curves forwardly toward said inlet end of said valve member at a central location across said width dimension to define a front leading edge. A bottom valve seal is formed between the bottom layer of the valve member and the bottom sheet of the stem portion. The bottom valve seal is positioned adjacent to the inlet end of the valve member, and the back valve seal extends substantially perpendicularly from the longitudinal edges of the valve member and curves forwardly toward the inlet end of the valve member at a central location across the width dimension to define a back leading edge.

6 Claims, 8 Drawing Sheets

OTHER PUBLICATIONS

Convertidora Industriale of Mexico, available as early as Dec. 31, 1996, see Valve A on attached p. 1.

Bonsai of Japan, available as early as Dec. 31, 1996, see Valve B on attached p. 2.

Bonsi of Japan, available as early as Dec. 31, 1996, see Valve C on attached p. 3.

Kashiwara, available as early as Dec. 31, 1995, see Valve D on attached p. 4.

Classic Ballon Company, available as Dec. 31, 1996, see Valve E on attached p. 5.

Valve Seal Designs (A), (B), (C), (D) and (E).

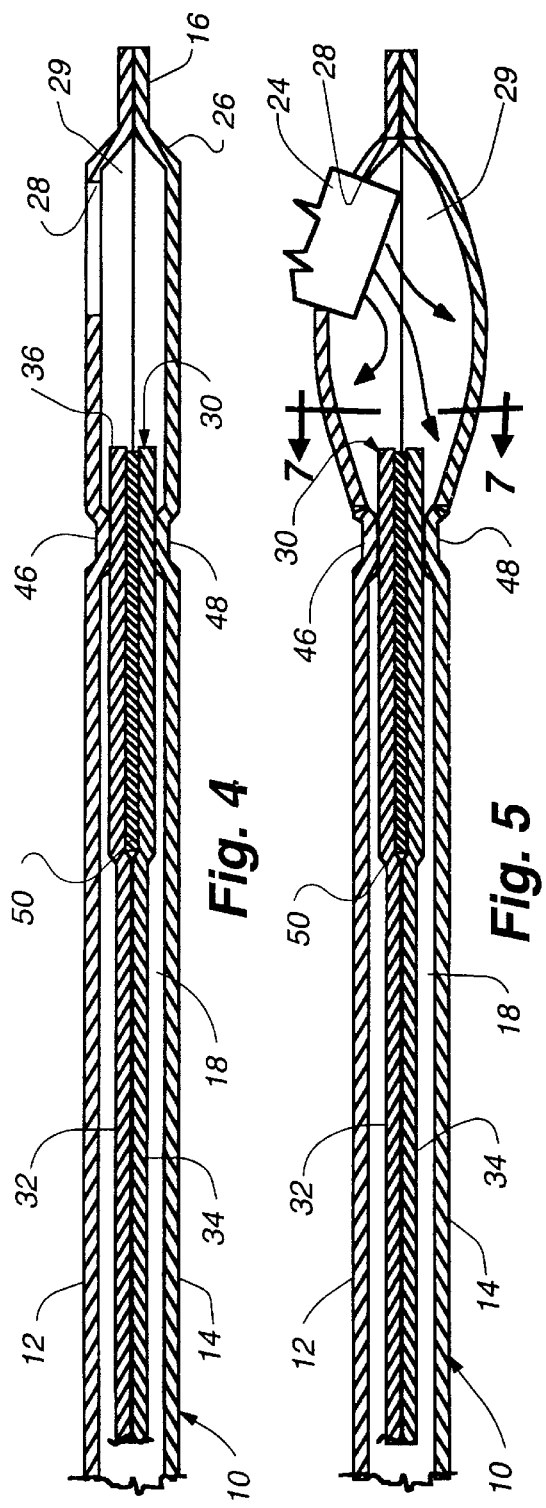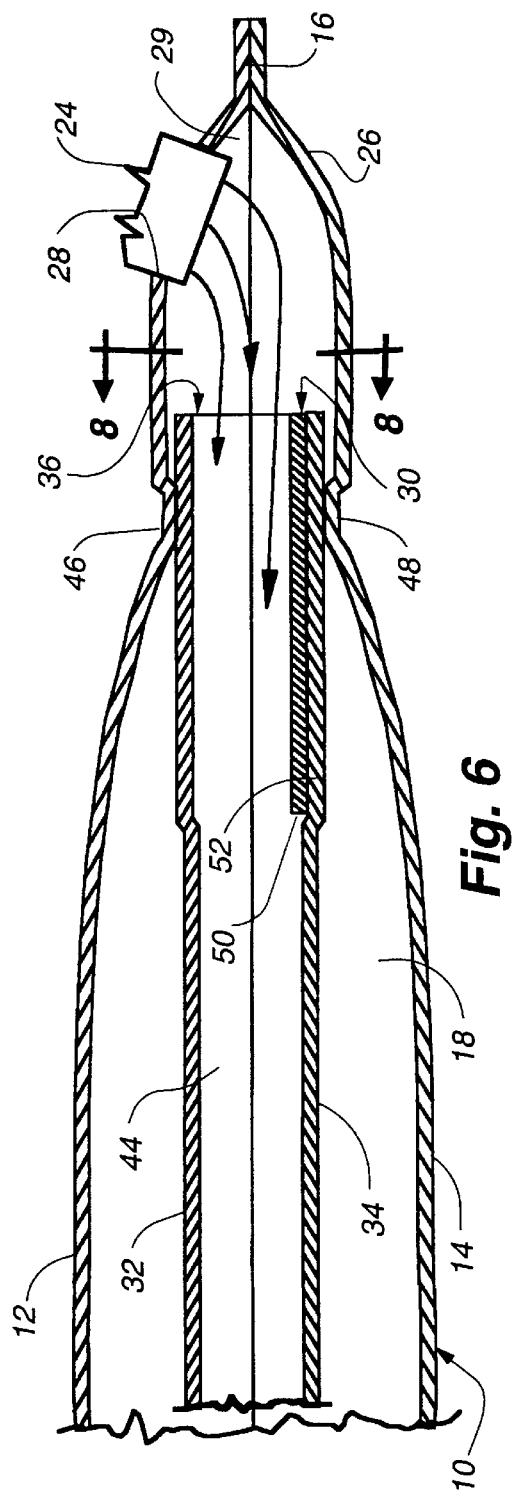

BALLOON VALVE AND METHOD OF PRODUCING

CROSS-REFERENCE TO RELATED APPLICATIONS

This application is a division of U.S. application Ser. No. 08/775,219, filed Dec. 31, 1996, U.S. Pat. No. 5,934,310.

BACKGROUND OF THE INVENTION

1. Field of the Invention

The present invention relates generally to a valve for filing inflatable pouches and associated manufacturing method, and more particularly to a self-sealing valve for non-latex balloons that opens more easily under inflow gas pressure.

2. Description of the Prior Art

Non-latex balloons have become very popular for use in celebrations of all kinds. Typically the balloons include a main body with an intricately formed stem for receiving a nozzle used to inflate the main body of the balloon. A valve is normally positioned partially in the stem and partially extending into the main body to facilitate filling the main body with the appropriate gas, and also to automatically seal when the main body is full of the gas.

Certain available valves are designed with top and bottom edges of the valve extending to the same length. This requires fairly strict manufacturing tolerances, and oftentimes the two even edges of the valve portion improperly divert the inflow gas pressure to fold the valve member, which keeps the valve from popping open, thus causing the stem of the balloon to burst under the inflow gas pressure. If the valve portion is sealed even slightly away from the even edges, then the valve is likely not to open under the inflow gas pressure.

Other presently available valves require the nozzle to be inserted into the valve inside the stem. Inserting the nozzle into the valve, which is positioned inside the stem, potentially damages the valve and the airtight seal between the valve and the balloon material. The valves in the stem have been designed to automatically open under typical inflow gas pressure. The nozzle is normally first inserted into the stem, and the gas is then turned on. The inflow gas pressure from the nozzle is typically, although not consistently, adequate to open the self-sealing valve to allow the flow of gas into the main body. Some valves are positioned inside the stem such that insertion of the nozzle into the stem automatically inserts the nozzle into the valve. These types of valves are easily damaged.

Another available valve has the leading edges extending beyond the stem portion. This requires the valve to be opened by hand to insert the nozzle. This typically requires two hands to open the valve and hold the balloon, which is slow and awkward.

In manufacturing most of these valves, many problems are normally encountered as a result of alignment problems in assembling the valves, and attaching the assembled valves to the balloon material. Typically, balloon valves are first separately assembled, or purchased pre-assembled, and then in a separate assembly step are positioned to extend from the stem into the main body of the balloon while the halves of the balloon are attached together and sealed generally around their perimeter.

Some problems associated with present manufacturing techniques include the variability of valve positioning in the balloon stem. In addition, the valves are normally purchased from an outside source and must be inserted into the balloon during the manufacturing step, as discussed above. This can result in problems related to inadequate supplies and subjects the user to quality and demand variations.

It is with the above-mentioned inadequacies that the balloon valve, and associated manufacturing method, of the present invention have been developed.

SUMMARY OF THE INVENTION

The present invention provides a solution to the problems set forth above, and regards the provision of a valve for use in automatically allowing gas or liquid to flow into an interior chamber of a bag, and a related method of manufacturing the valve, the valve having a unique seal structure to facilitate the reliable opening of a valve member under inlet gas or liquid pressure.

More particularly, the invention relates to a bag for holding a gas or liquid, the bag including a main body having a stem portion, the main body defining an interior space and formed from a front and back sheet sealed together about a peripheral edge. The stem defines an inlet aperture at a free end thereof. A valve member has a width dimension positioned in the stem for use in inflating the main body, the valve member including a flexible front layer and a flexible back layer. The front layer is adjacent to the front sheet, and the back layer is adjacent to the back sheet. Both the front and back layers define opposing elongated edges. The front and back layers are attached together along the elongated sides to form a seal. The valve member has an inlet end and an outlet end, the inlet end is adjacent to the inlet aperture, and the outlet end is positioned in communication with the interior chamber of the main body. A front valve seal is formed between the top layer of the valve member and the top sheet of the stem portion. The top valve seal is positioned adjacent to the inlet end of the valve member, the front valve seal extending substantially perpendicularly from the longitudinal edges of the valve member and curves forwardly toward said inlet end of said valve member at a central location across said width dimension to define a front leading edge. A bottom valve seal is formed between the bottom layer of the valve member and the bottom sheet of the stem portion. The bottom valve seal is positioned adjacent to the inlet end of the valve member, and the back valve seal extends substantially perpendicularly from the longitudinal edges of the valve member and curves forwardly toward the inlet end of the valve member at a central location across the width dimension to define a back leading edge.

A method for manufacturing the valve member in a bag for containing a gas or liquid is also disclosed. The bag includes a front sheet, a back sheet, and a stem. It also includes a valve having a front side and a back side. A seal is formed between the front sheet of the balloon and the front side of the seal, and between the back side of the valve and the back sheet of the balloon. The method comprises the steps of providing a double-wound roll of valve material; providing a single-wound roll of back sheet material; providing a single-wound roll of front sheet material; forming longitudinal seals in said valve material to form individual valve members; separating adjacent individual valve members; spacing said adjacent individual valve members apart; forming the seal between the back sheet material and the back side of the individual valve member; applying the front sheet material to the combination of the valve member and the back sheet material; forming a seal between the back sheet material and the front sheet material; and forming a seal between the front sheet material and the front side of the individual valve member.

A more complete appreciation of the present invention and its scope can be obtained from the accompanying drawings, which are briefly summarized below, and the following detailed description of presently preferred embodiments of the invention, and the appended claims.

BRIEF DESCRIPTION OF THE DRAWINGS

FIG. 4 is an enlarged view taken along line 4—4 of FIG. 3.

FIG. 5 is an enlarged view similar to FIG. 4, showing a nozzle inserted into the stem and inflow gas entering the stem from the nozzle.

FIG. 6 is an enlarged section similar to FIG. 5, showing the valve member of the present invention open to allow the inflow gas to pass through the valve and into the chamber of the balloon.

FIG. 10 is a plan view of the valve member of the present invention.

FIG. 12 is schematic representation of the placement of the valve member onto the balloon during operation of the inventive manufacturing method.

DETAILED DESCRIPTION

As used herein, the term "balloon" refers to any inflatable bag having a main body and an associated inflation stem. An inflation valve could be inside the stem, or inside a pouch which acts as a valve to allow air into a separate pouch, such as an internal chamber in a multi-chambered inflatable bag. Also, in the description provided below, examples are described utilizing gaseous material, while the invention is believed to work equally well with liquid material.

Figure 1:
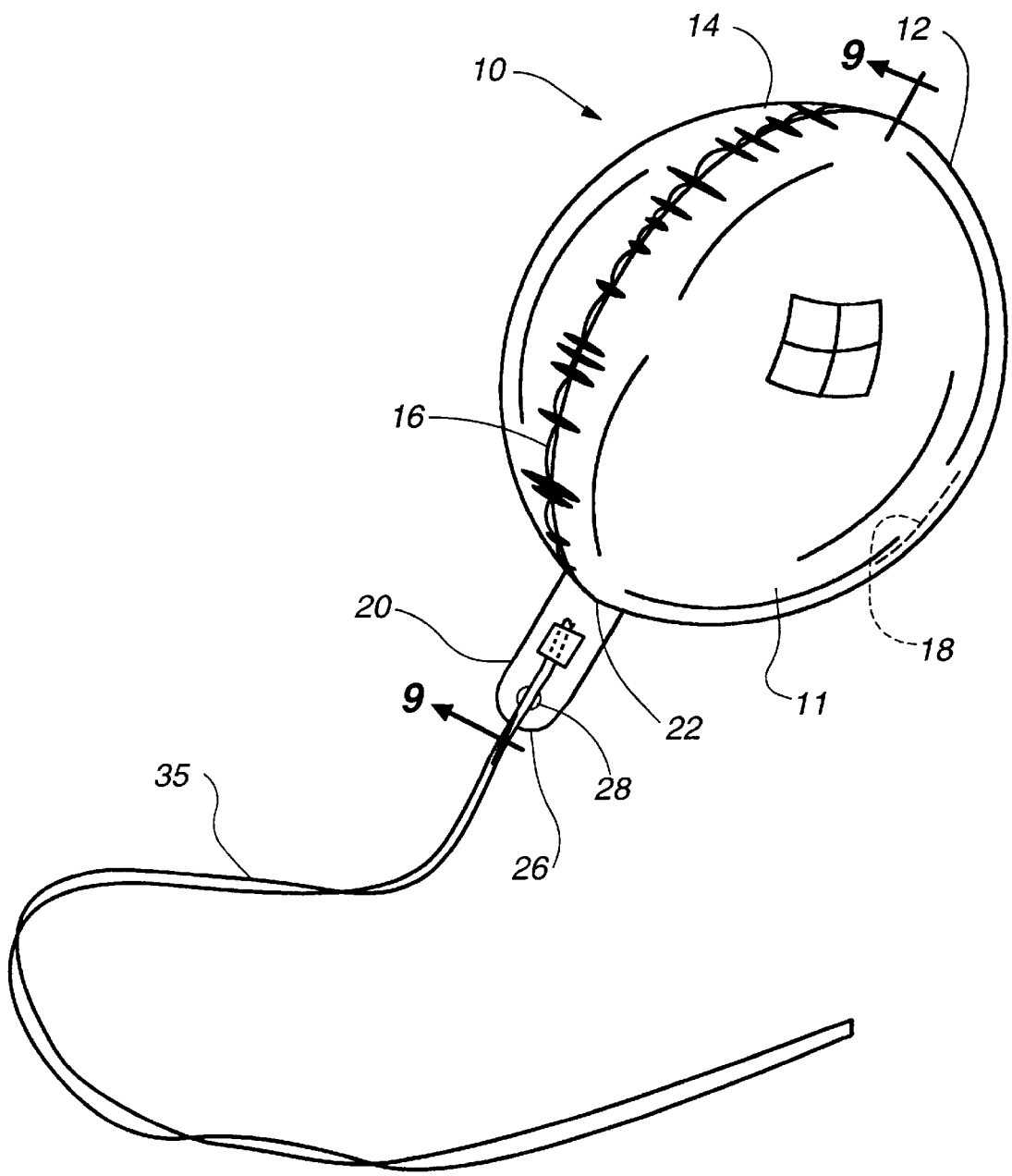
FIG. 1 is a perspective view of a balloon incorporating the valve member of the present invention therein.

Referring first to FIG. 1, an inflated non-latex balloon 10 incorporating the present invention is shown. The balloon main body 11 is made of a front sheet 12 and a back sheet 14 sealed together about their corresponding peripheral edges 16 to create an airtight interior chamber 18. A stem 20 is formed at a bottom end 22 of the balloon. A valve member (not shown), having a front and back layer, is positioned in the stem 20 and extends into the interior chamber 18 of the balloon. The front 12 and back sheets 14 of the balloon 10 are sealed to the front and back layers of the valve member, respectively, to form a front and back valve seal of the present invention, as is described in more detail below.

Figure 9:
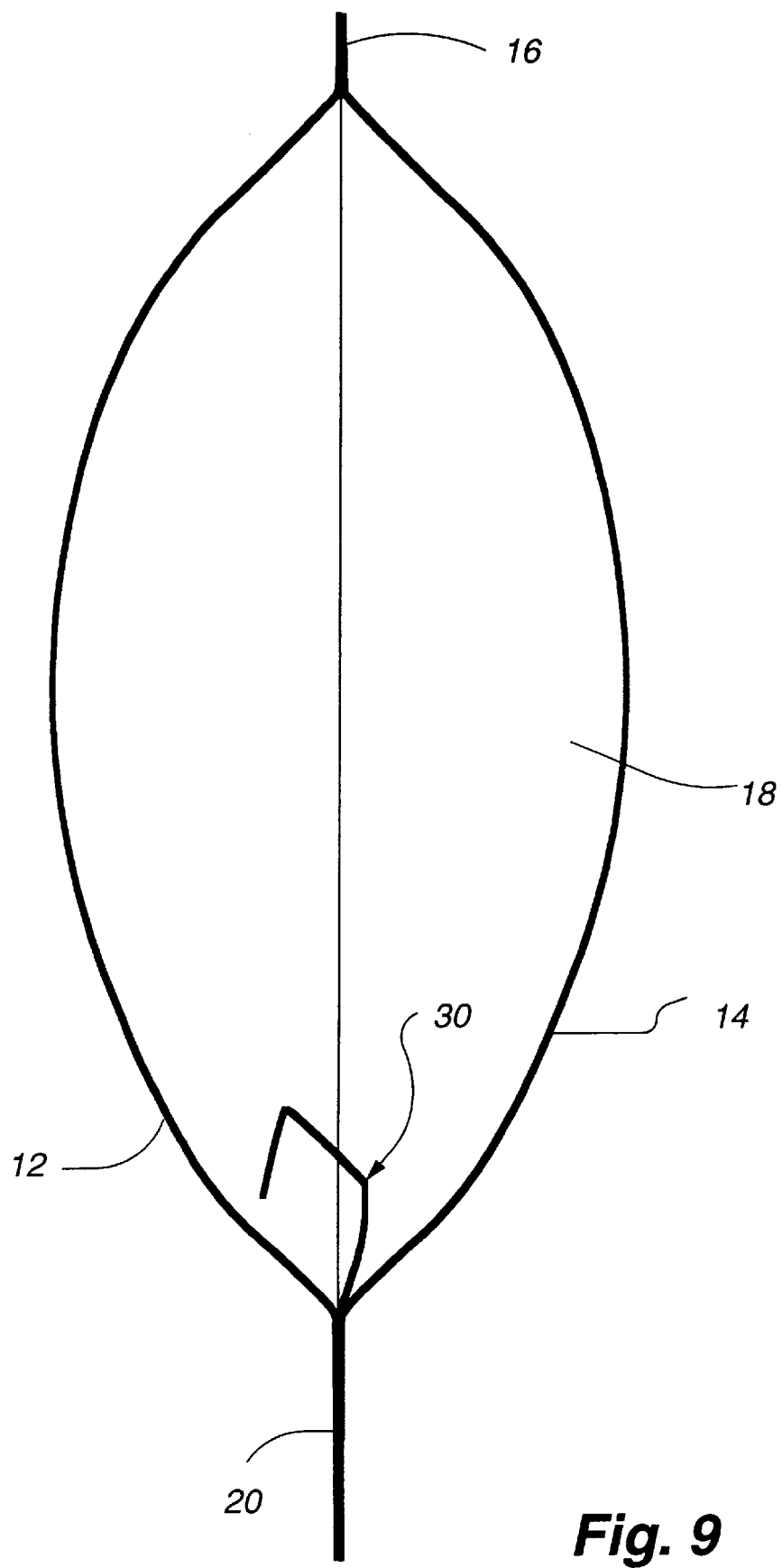
FIG. 9 is a section taken along line 9—9 of FIG. 1.

As shown in FIGS. 4, 5 and 6, the balloon 10 is filled with a desired gas, such as helium or air, from a nozzle 24 connected to a source tank, such as a compressed gas cylinder (not shown). A free end 26 of the stem defines an inlet aperture 28 into which the nozzle is inserted prior to filling the balloon 10. Once the nozzle 24 is inserted into the inlet aperture 28 (and into a stem chamber 29), the gas is allowed to flow from the nozzle 24 through the stem 20 into the valve 30. The inflow gas pressure flows to impact and affect the front transverse valve seal 46 formed between the front valve sheet 32 and the front balloon sheet 12, and the back transverse valve seal 48 formed between the back valve sheet 34 and the back balloon sheet 14, which automatically opens the valve member 30 under the inflow gas pressure to allow the gas to flow through the valve member 30 and into the interior chamber 18 of the balloon. When the balloon 10 is adequately full, the inflow gas is terminated at the nozzle 24, and the higher gas pressure inside the interior chamber collapses the front 32 and back 34 sheets of the valve member 30 together to trap the gas inside the balloon. Typically, the length of the valve member 30 inside the interior chamber of the balloon can fold over onto itself as shown in FIG. 9 to further assist in seating the valve member 30. A string or ribbon 36 or other handling device can be attached to the stem 20, and thus the balloon 10.

The front 12 and back 14 sheets of balloon 10 material are typically constructed of a layer of biaxially oriented nylon having an aluminum film on the external side and a polyethylene film on the internal side. The film on the internal side can also be linear low polyethylene, which forms a better seal than normal polyethylene. Each of the front and back sheets are typically approximately 0.00125 inches (1 and ¼ mil) in total thickness.

Figure 2:
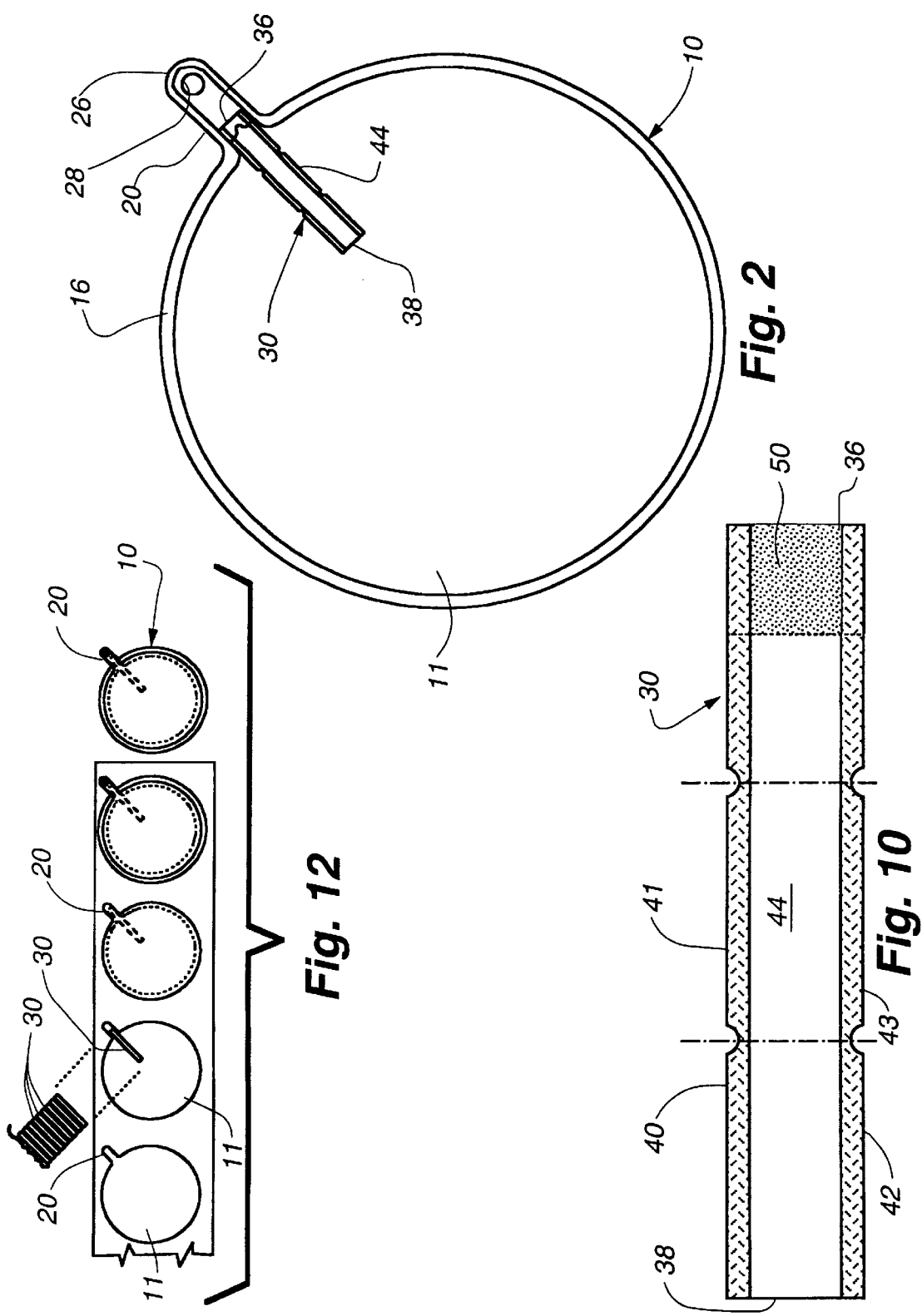
FIG. 2 is a representative plan view of the balloon of FIG. 1, showing the relative location of the valve member of the present invention in the balloon.

Referring now to FIG. 2, the valve member 30 of the present invention is positioned inside the balloon 10 and extends continuously from inside the stem 20 to a distance of approximately 4–7 inches inside the interior chamber 18 of the balloon 10. The valve member has an inlet end 36 and an outlet end 38, with the valve seals 46 and 48 being formed adjacent to the inlet end 36 of the valve member 30. The inlet end 36 is positioned in the stem 30, and the outlet end 38 is positioned in the interior chamber 18 of the main body.

Figure 3:
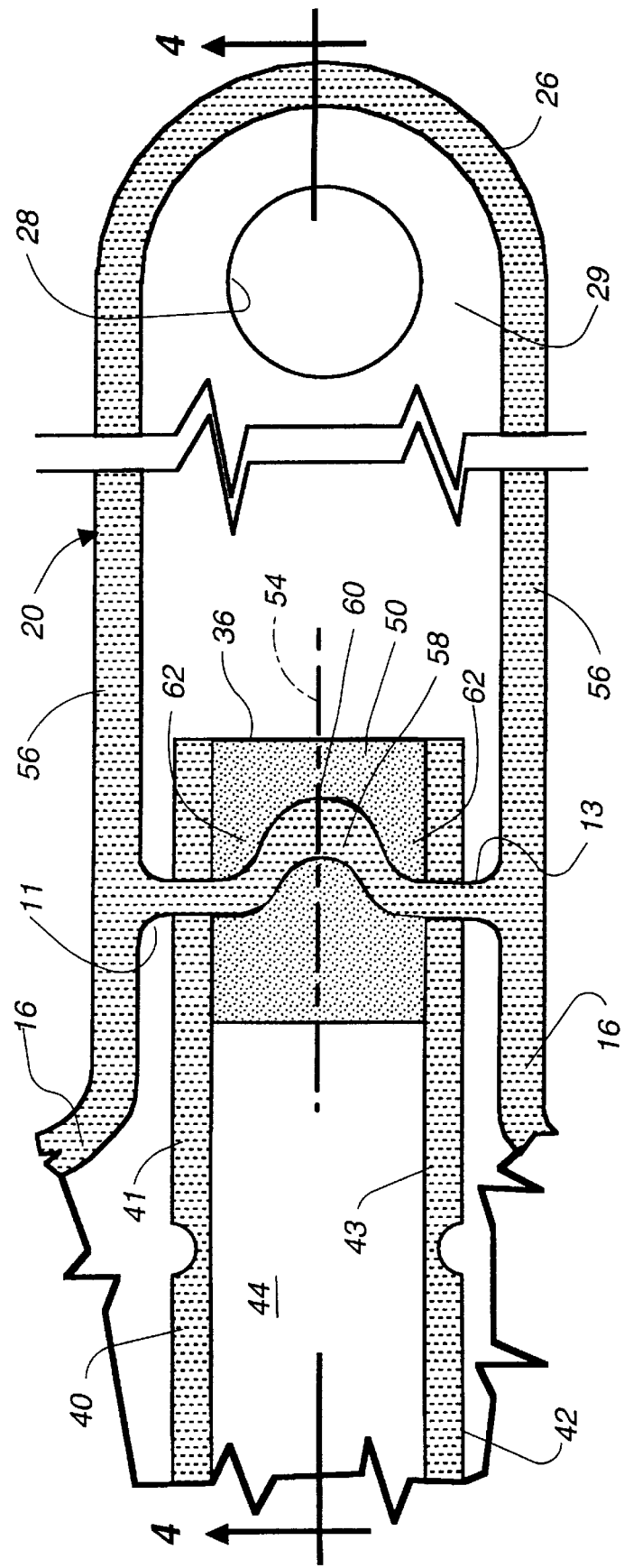
FIG. 3 is an enlarged representative view of the stem portion of the balloon with the valve member of positioned therein, and shows the inventive valve seal.
Figure 7:
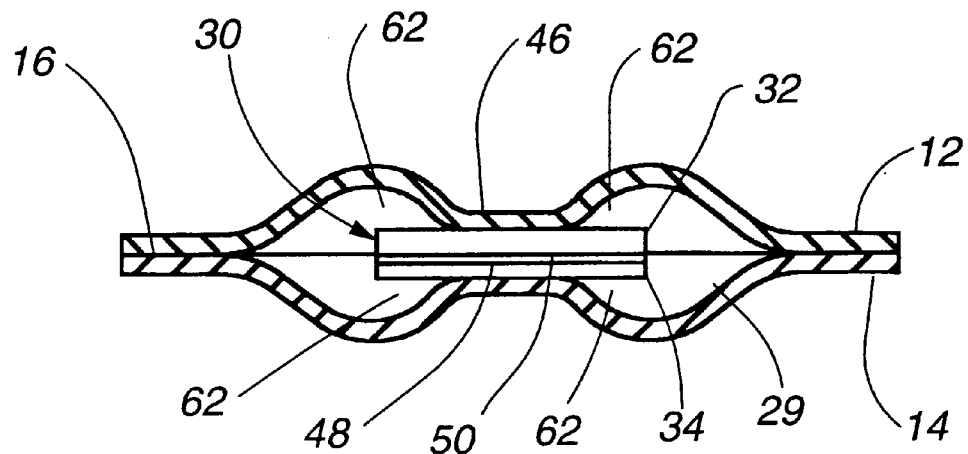
FIG. 7 is an enlarged section taken along line 7—7 of FIG. 5.

Referring now to FIGS. 3, 4 and 10, the valve member 30 is made of a front 32 and back 34 layer of very thin polyethylene film, preferably 1 to 1½ mils thick. The valve member 30 has an elongated rectangular shape defining opposing elongated side edges 40 and 42. The front 32 and back 34 sheets are sealed together at 41 and 43 along the side edges 40 and 42. The valve member 30 is typically ½ to 1 inch wide, and approximately 5–12 inches long. A channel 44 is formed along the entire length of the valve member 30 between the opposing elongated sealed side edges 40 and 42 to allow the flow of the input gas therethrough. The channel 44 is normally in a closed position, which does not facilitate gas flow. The front and back layers of the valve member can be separated from one another, such as by the inflow gas pressure as described hereafter, to form the channel 44 through the valve member 30 which facilitates the flow of gas therethrough.

The front 12 and back 14 balloon sheets are sealed to the front 32 and back 34 valve layers, respectively, forming a front transverse valve seal 46 and a back transverse seal 48. The shape of the front 46 and back 48 valve seals is preferably identical. The front 46 and back 48 valve seals are formed across the stem 20 near the main body of the bottom 10, and fix the balloon sheets 12 and 14 to the valve member 30 adjacent to the inlet end 36 of the valve member. The shape of the transverse seals 46 and 48 are important to the operation of the valve member 30 of the present invention.

The seals 46 and 48 formed between the front 12 and back 14 balloon sheets and the valve member 30 hold the valve member in its proper position with respect to the balloon. The front 46 and back 48 transverse valve seals are formed, as is explained in greater detail below, after the valve member 30 is assembled. The valve member is not as wide as the stem 20 of the balloon, so the front 12 and back 14 sheets of the balloon are sealed directly together along the front 11 and back 13 valve seals where the valve member 30 is absent, such as near the edges 56 of the stem 30.

Referring to FIGS. 4–6, a seal-blocking material, such as high temperature blocking ink 50 or a non-sealable material (e.g. polyester or teflon) is applied to the interior side 52 of the inlet end 36 of the back layer 34 of valve film (FIG. 6) to prevent the top 32 and bottom 34 valve layers from being sealed together during the formation of the front 46 and back 48 transverse valve seals. The blocking material 50 is positioned on the interior side 52 of the back layer 34 of valve material, and does not cover the longitudinal edges 40, 42 of the back sheet 34 so as to not interfere with the longitudinal edge seals 41, 43.

The shape of the valve seals 46 and 48 are fundamental to its improved performance in opening the channel 44 formed along the length of the valve 30 during the filling process. The valve seals 46 and 48 are effectively a continuation of the edge seal 16, which attaches the perimeter of the front 12 and back 14 sheets of the balloon 10. The valve seals 46 and 48 extend from the edge seals 56 of the stem 20 towards the axial center line 54 of the stem portion 20. Again, preferably each seal 46, 48 is identically shaped in a central region of the stem portion 20 substantially symmetric to the axial center line 54 of the stem 20. The valve seals 46 and 48 extend in a smooth curve 58 towards the inlet aperture 36 to form a leading edge 60. In other words, the valve seals 46 and 48 are symmetrical about the axial center line 54 of the stem 20, and extends from a forwardly positioned leading edge and slopes rearwardly and outwardly to terminate at substantially right angles with the edge seams 56 of the stem portion 20. The width of each valve seal 46, 48 adjacent the edges of the stem 20 is approximately ⅛ inches. The width of the valve seal at the leading edge 60 of the valve seal is approximately 3/16 inches. The width of each valve seal 46, 48 is greater at the leading edge 60 than at the outer edges adjacent the stem edge seal 56. The change in thickness is preferably gradual. The valve seals 46, 48 define two internal volumes in the balloon, the first being coextensive with the interior chamber 18 of the main body, and the second volume 29 being defined inside the stem 20. The only passageway between the two chambers is the channel 44 through the valve member.

A lift region 62 is formed on either side of the leading edge 60, and is defined on one side by the leading edge 60 of the valve seal 46, on a second side by the valve seal 46 as it extends toward the edge seal 56 of the stem 20, and on a third side by the edge seal 56 of the stem 20. The lift region 62 is open on the side towards the inlet aperture 28. Identical lift regions are formed relative to transverse seal 48. The importance of the lift regions 62 will be described in greater detail below. The distance between the inlet end 36 of the valve member 30 and the leading edge 60 of the valve seal 46 is between 0 and 5/16 of an inch for valve widths of ½ to approximately 1 inch. The distance between the leading edge 60 of the valve seal and the inlet end 36 of the valve member 30 is generally related to the width of the valve 30 itself. The larger the width, the greater the allowable distance. The front valve seal 46 is preferably identical to and positioned co-extensively with the back valve seal 48. However, exact coextensive alignment between the front 46 and back valve seals 48 is not necessary, as it has been found that the leading edges of the valve seals 46 and 48 can be misaligned by up to approximately ¼ inch and still properly function. Preferably the offset between the leading edge 60 of the top 46 and bottom 48 valve seals would be no more than approximately 1/16 of an inch.

Referring now to FIGS. 4, 5, 6, 7 and 8, the operation of the inventive valve 30 is illustrated. The valve of the present invention is shown in the unused state in FIG. 4, prior to the insertion of the nozzle 24 through the inlet aperture 28 formed in the stem 20. The nozzle 24 is first inserted through the inlet aperture 28, as shown in FIG. 5, after which the inflow gas is released. The inflow gas typically flows from the nozzle 24 at a pressure of approximately 10 PSI. The inflow gas initially enters the chamber 29 formed inside the stem 26 and expands the chamber 29 as shown. The inflow gas quickly contacts the leading edge 60 of the front 46 and back 48 valve seals, and is diverted into the lift regions 62 formed on either side of the front and back leading edges of the valve seals.

Figure 8:
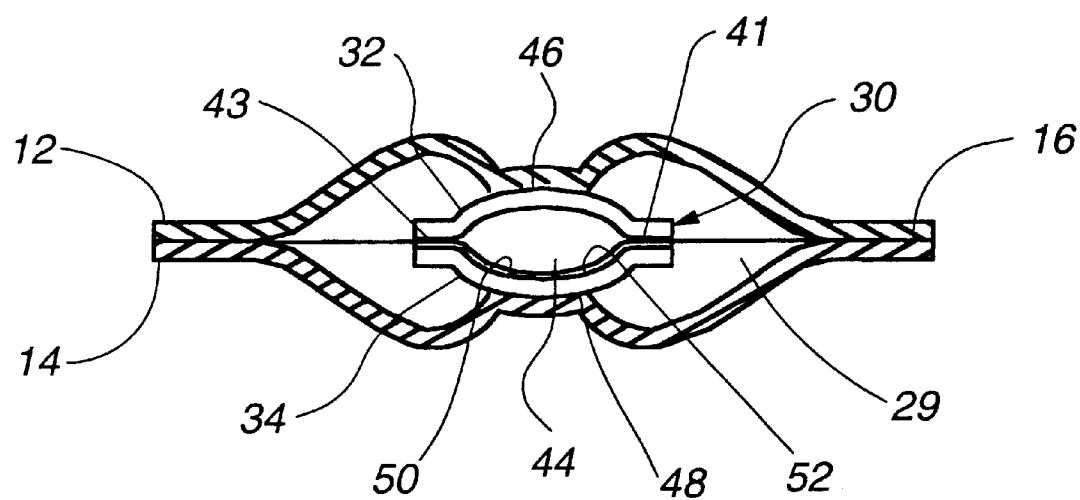
FIG. 8 is an enlarged section taken along line 8—8 of FIG. 6.

The inlet gas pressure exerts a force on the front 12 and back 14 sheets of the balloon 10 in the lift regions 62 surrounding the top and bottom valve seals, as well as along the walls of the stem, and generates an outwardly directed force on the front 12 and back 14 sheets if the balloon 10. The front 12 and back 14 sheets are attached to the front 32 and back 14 layers of the valve member 30, respectively, and as the front 12 and back 14 sheets spread apart, they each pull their respective portion of the valve member 30 apart, and act to "pop" open the channel 44 formed through the valve member 30, as shown in FIGS. 6 and 8. Once the channel 44 in the valve member 30 has been formed by the inlet gas pressure, the gas then travels through the channel 44 into the interior chamber 18 of the balloon to fill the balloon with gas.

When the balloon 10 is adequately filled with gas, the user terminates the inlet gas flow at the nozzle 24 causing the gas to stop flowing through the channel 44 in the valve member 30. Since the pressure of the gas inside the balloon 10 is greater than atmospheric pressure, the channel 44 in the valve member 30 is closed by the higher internal pressure exerted on the front 32 and back 34 layers of the valve member 30. The balloon is thus filled with the desired gas through the valve member 30 having inventive valve seals 46, 48. The advantages of the inventive valve seals are that they provide more certain valve opening to reduce valve malfunction, and they are insensitive to manufacturing variations.

Figure 11:
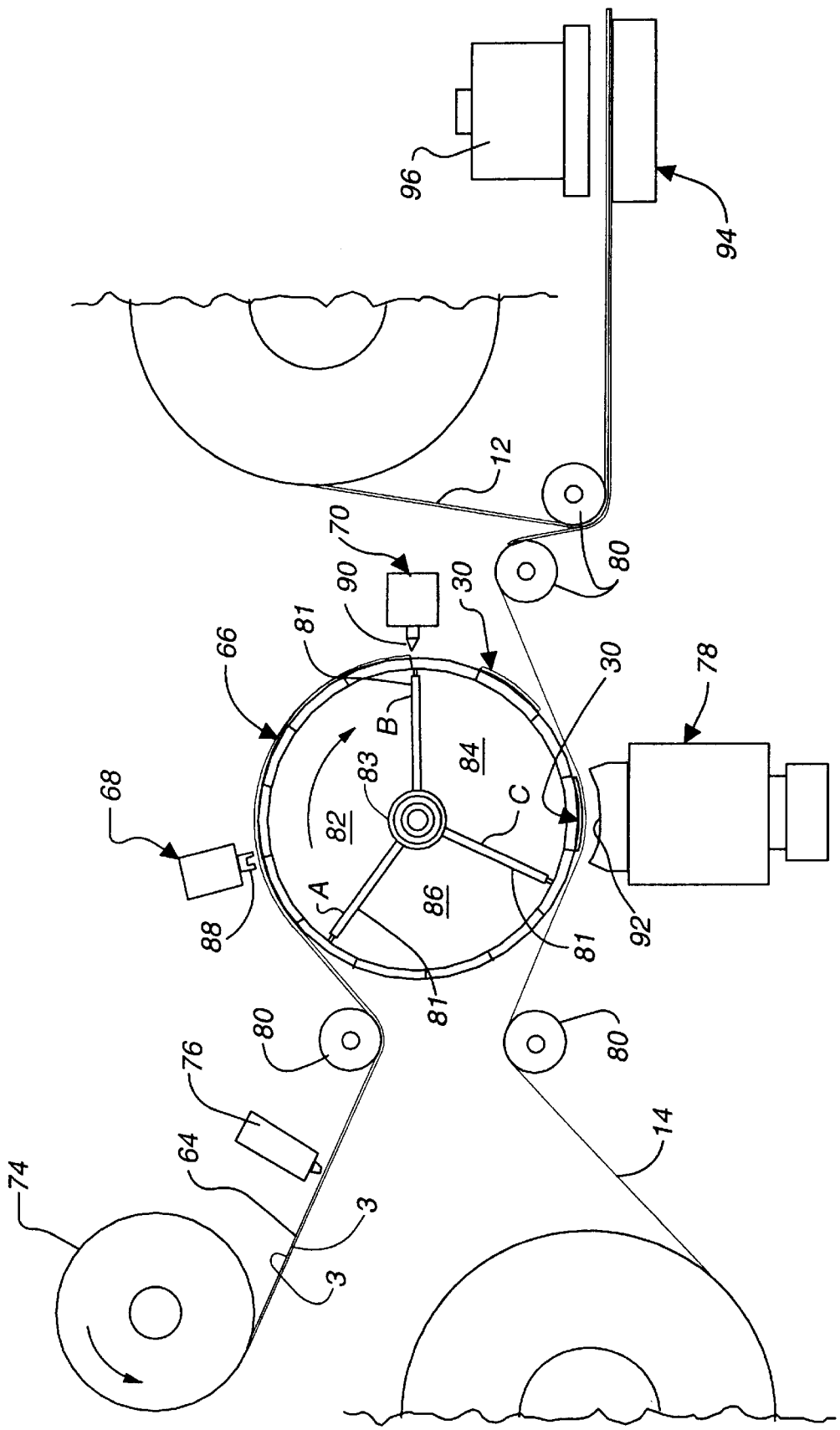
FIG. 11 is a schematic representation of the manufacturing method for assembling the valve member of the present invention into a non-latex balloon.
Figure 13:
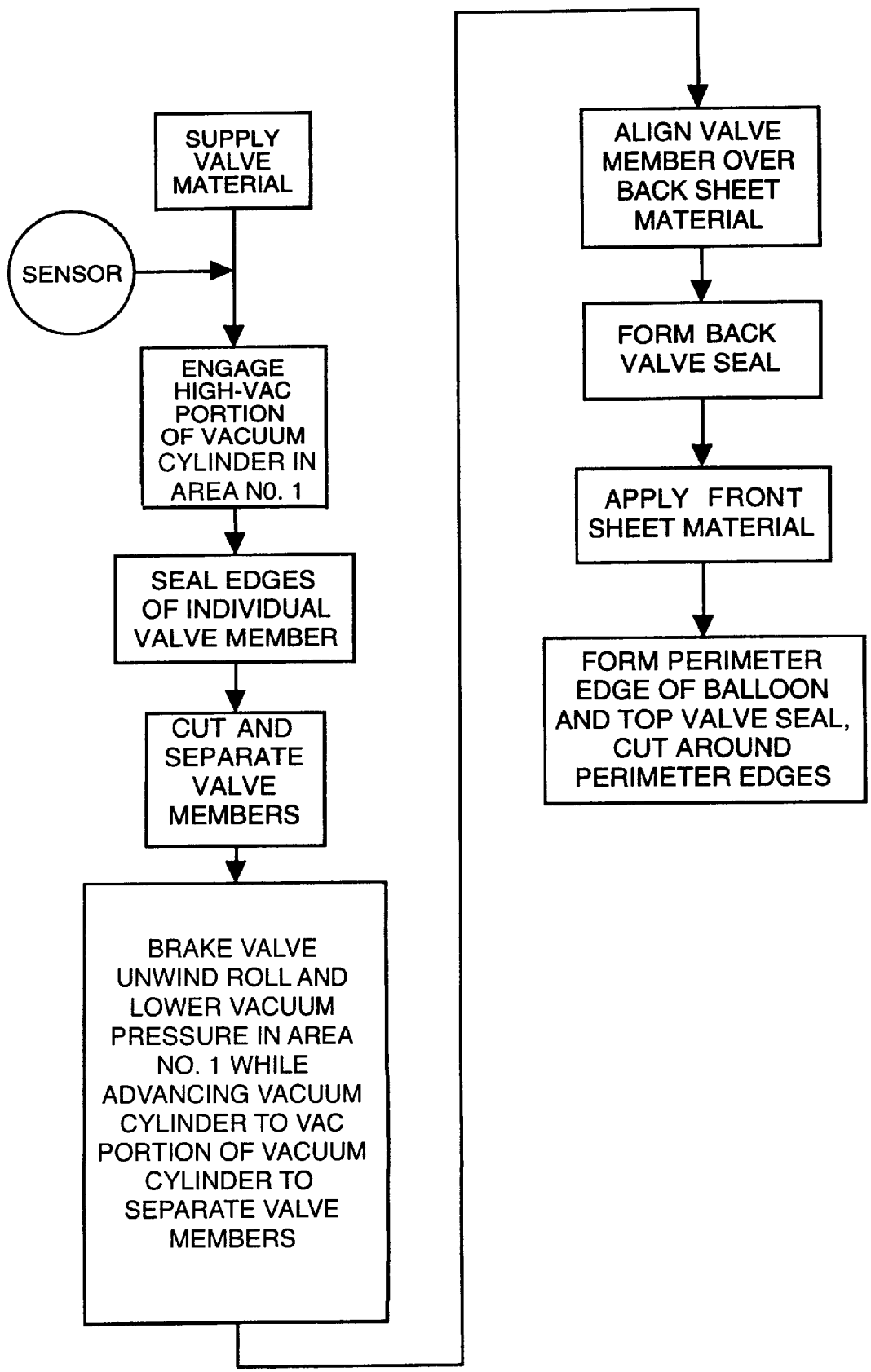
FIG. 13 is a flow diagram outlining the main steps of the inventive manufacturing method.

FIGS. 11 and 12 show a manufacturing process by which the novel balloon valve 30 of the present invention is assembled and incorporated into a non-latex balloon, as is described hereinafter. Generally, the valve material 64 is provided to a vacuum cylinder 66 which grips the valve material 64 and upon which three operations are performed The first operation is the formation of the longitudinal edge seals 41, 43 of each individual valve member 30 at seal operation 68, then the individual valves 30 are separated from one another at a cutting operation 70, and then the valve 30 is positioned at the appropriate location on a supply of back sheet material 14 where the back transverse seal 48 is formed between the back 14 sheet material and the back layer 34 of the valve member 30. The combined valve member 30 and back sheet material 14 move beyond the vacuum cylinder 66 to the next stage where the front sheet material 12 is applied to the combination valve member 30 and back sheet material 14, and finally onto a stamp operation 72 where the front valve seal 46 is formed between the front sheet 12 of the balloon material and the front layer 32 of the valve member 30, while at the same time the perimeters 16 of the front 12 and back 14 sheets are heat sealed together and cut to form the balloon shape.

In more detail, the valve material (front and back layers) is preferably double wound on a free-wheeling unwind roller 74 which has a brake, such as an air brake known in the art, for selectively controlling the web tension, and thus the rate at which the valve material 64 is released from the unwind roller 74. The double wound valve material 64 allows the integral production of the valve member 30 and the application of the valve member to the balloon 10 during production of the balloon. The double wound valve material 64 is continuous in the length dimension, limited only by the practicality of roller sizes, and is as wide as the resulting valve member 30 is long. The seal proof blocking material is preprinted in the appropriate spaced positions along the length of the interior side of the valve material 30, as described above. The valve material 30 is removed from the unwind roller past an optical scanner 76 which is sensitive to the blocking material markings on the valve material 64, and thus senses the position of the valve material 64 and rate of movement and is used to control the timing of the edge seal 68, cut 70 and valve seal 78 operations.

The valve material then passes under an idler roller 80 and over the vacuum cylinder 66. The vacuum cylinder 66 has stationary baffles 81 defining three fixed position vacuum levels around the circumference of the cylinder 66. The vacuum is applied through apertures (not shown) formed in the cylinder walls 67. The first vacuum chamber 82 has a variable vacuum level, and can be set at either a high level of vacuum for securing the valve material 64 to the cylinder 66, or a low level of vacuum to allow the valve material 64 to slide over this area of the vacuum cylinder 66. The second vacuum chamber 84 has a relatively medium level of vacuum, and the third vacuum chamber 86 has no vacuum.

The valve material 64 is initially gripped by the first vacuum chamber 82 of the cylinder 66 under high vacuum and is held tightly thereto. The vacuum cylinder 66 is driven to pull the double wound valve material 64 from the unwind roller 74. The air brake on the unwind roller 74 controls the removal of valve material 64 from the unwind roller. While under the effect of the high vacuum pressure, the edge seals 41 and 43 of the valve member 30 are formed at operation 68. The longitudinal edge seals 41, 43 of the valve member 30 are formed at the edge seal operation 68. The edge seal operation 68 heat seals the front and back layers of valve material together to form the edge seals 41 43, which extends along the width of the double wound valve material (which defines the length of the individual valve member 30). The edge seal mechanism 88 (thermo-heat seal bar) is designed to form the longitudinal edge seals 41, 43 of the valve members 30 between the spaced apart blocking material patterns positioned on the double wound valve material 64. The edge seal mechanism 88 forms adequate seals in the valve material at 350 degrees Fahrenheit with a dwell time of 0.25 seconds under 50 PSI. The edge seal mechanism 88 can be designed to form an unsealed region between adjacent seals of different valve members 30 to allow air to escape from the sealed areas to avoid bubbles in the seal and to form a better seal.

The vacuum cylinder 66 rotates to pull the double wound valve material 64 off of the unwind reel 74 and move the sealed valve material 64 towards the cutting station 70. At the cutting station 70 the width of the double wound material 64 is cut along each longitudinal seal 41, 43 to separate the individual valve members 30 from the continuous double wound valve material. The cutting station can utilize any suitable cutting technique, such as a hot cut system, a rotary cut system, or a flying knife cut system. Any of these cutting systems are suitable for cutting along the longitudinal edge seals 41, 43 of each individual valve member 30.

At the cutting operation 70, an individual valve member 30, while still formed as part of continuous double wound valve material 64, is advanced past the cutting blade 90 to a position where the cutting blade is aligned with one of the longitudinal seals 41, 43 formed at the edge seal operation. The cutting blade 90 slices through the double wound valve material 64 through the longitudinal edge seals 41, 43 to which it is aligned to separate an individual valve member 30 from the continuous double wound valve material 64. At this point the air brake on the unwind reel 66 is applied to resist movement of the unwind reel 74, and the vacuum in the first vacuum chamber 82 is lowered to allow the supply of valve material 64 to the vacuum cylinder to slip over the vacuum cylinder as it is advanced the width of one individual valve member 30 to space the previously separated valve member 30 away from the end of the double wound valve material for the reasons set forth below. The air brake is then released, and high vacuum pressure is resumed in first vacuum chamber 82, and the vacuum cylinder 66 is advanced the width of one valve member 30 so the next adjacent longitudinal seal 41 or 43 is aligned with the cutting blade 90 in order to allow the cutting blade to slice through the seal 41 or 42 and separate the next valve member 30 from the continuous double wound valve material 64. At this point the air brake on the unwind reel 74 is applied again, and the vacuum in the first vacuum chamber 82 is reduced, while the vacuum cylinder 66 rotates to advance the newly cut valve member 30 one valve member width away from the end of the double wound valve material 64. This process is repeated to space the individually cut valve members away from each other for the subsequent back transverse seal operation, described below.

When the air brake is applied on the unwind roller 74, and the vacuum in the first vacuum chamber is reduced, the vacuum cylinder 66 rotates a predetermined distance, such as the width of an individual valve member, which causes the vacuum cylinder 66 to break the vacuum seal and slide underneath the double wound valve material 64. The air brake is strong enough to overcome the vacuum grip between the vacuum cylinder 66 and the double wound valve material 64 to allow the valve material 64 to stay stationary as the cylinder 66 rotates underneath it.

The individually spaced valve members 30, during this process, are stepped towards the back transverse seal formation station 78 where the back transverse seal 48 is formed between the back sheet 14 of the balloon material and the back layer 34 of the valve member 30.

The three separate vacuum chambers 82, 84 and 86 on the surface of the vacuum cylinder are created by a set of three baffles 81 positioned stationarily inside the rotating vacuum cylinder 66. The variable (high to low) vacuum level portion (first vacuum chamber) 82 is defined between baffle A and baffle B, baffle A being positioned to extend radially from the axial seal 83 at the center of the vacuum cylinder to the outer wall of the vacuum cylinder 66 at a position approximately adjacent to the location where the double wound valve material 64 contacts the vacuum cylinder 66. Baffle B is positioned approximately adjacent and in line with the edge cutting device and forms the first vacuum chamber between axial seal 83 and baffles A and B. The vacuum cylinder rotates, for instance, clockwise in FIG. 11, while the baffles A and B remain stationary so the vacuum areas remain relatively stationary regardless of the movement of the vacuum cylinder over the baffles 81. The second vacuum area 84 is defined between the axial seal 83, baffle B and baffle C. Baffle C is positioned between the axial seal 73 and extends radially to the outer wall of the vacuum cylinder 66 approximately adjacent to, and just beyond, the back transverse seal station 78. This second vacuum area 84 correlates to where the spaced individual valve members are transported from the cutting station 70 to the back transverse seal forming station 78. The third vacuum area 86 is defined between the baffle C and the baffle A. There is no vacuum in this area, and possibly can even have positive pressure, to allow any unintentionally retained valve members 30 to fall from the vacuum cylinder 66 before the cylinder rotates to the position where the double wound valve material 64 engages the vacuum cylinder 66.

The rotation of the vacuum cylinder 66 advances the spaced apart individual valve members to the back transverse seal forming position 78. The individual valve member 30 to be sealed in this operation is oriented over the back sheet 14 of balloon material at an orientation to match where the stem 20 of the balloon will finally be formed, as shown in FIG. 12. The back transverse seal operation 78 includes a stamp 92 which is positioned adjacent to but spaced away from the vacuum cylinder 66 and is selectably moveable to engage the vacuum cylinder 66 at the position to seal the valve member 30 to the back sheet material 14 by forming the back transverse seal 48 as described above. The individual valve member 30, when positioned on the back sheet 14 in the proper location and sealed thereto, disconnects from the vacuum cylinder (the seal overcomes the force created by the vacuum pressure), and moves along with the continuous back sheet material 14 of the balloon 10 to the next station, described below. During the transverse seal step, the die stamp 92 is heated to a high temperature, such as 375 degrees Fahrenheit while the vacuum cylinder 66 remains cool, and the impression of the die stamp 92 against the vacuum cylinder 66 engages the appropriate portions of the back sheet 14 onto the appropriate portions of the valve member 30, and under the heat and pressure seals the two together in the desired shape as defined on the die stamp 92, such as the inventive seal shape discussed above.

The two sides 32 and 34 of the valve member 30 are not sealed together due to the blocking material 50 positioned therebetween which resists the heat seal. The individual valve members 30 are spaced apart during the back valve seal forming operation 78 since the back transverse valve seal 48 extends beyond the edges of the valve member 30 to the edges of the stem 20, and if the adjacent valve member 30 was positioned too close, it would interfere with the formation of the back valve seal 48.

The transverse seal operation 78 is synchronized to be performed at the same time as the cutting operation 70, which is synchronized to be performed at the same time as the longitudinal edge seals are formed at operation 68 since the vacuum cylinder 66 is moved in between each of these operations to advance the double wound valve material 64 around the vacuum cylinder 66.

Referring to FIG. 12, it is important to note that the back sheet material 14 is functionally continuous in length, and has a width sufficient to allow one side of the balloon shape to be stamped therefrom. To minimize material waste, since the stem 20 extends from the general shape of the balloon 10, in this case a circle, the stem 20 is positioned at an angle to the length and width of the back sheet material 14. To facilitate this angular placement of the valve member 30 at the appropriate location on the back sheet material 14, the vacuum cylinder 66 must be oriented at an angle to the flow of the back sheet material 14 in order to position the valve member 30 appropriately at an angle on the back sheet material 14. The outline of the balloon in FIG. 12 is representative only of the orientation of the balloon 10 to be stamped out of the back sheet material 14 at the end of the process, in order to show the orientation of the stem 20.

After the back transverse seal 48 has been formed between the valve member 30 and the back sheet 14 of the balloon material, the back sheet 14 of the balloon material continues towards the final stamping operation 94. Before reaching the final stamping operation 94, the front sheet material 12 is applied to the back sheet material 14 co-extensively thereto and together pass through the final stamping operation 94. At the final stamping operation, the front transverse valve seal 46 is formed between the front sheet of the balloon 12 and the front layer 32 of the valve member 30 across the stem 20, as described above. In addition, the perimeters of the front 12 and back 14 balloon sheets are sealed together to form peripheral edge 16 and cut out of the continuous front 12 and back 14 coextensive balloon sheet material to form the finished product.

The stamp 96 used at the final stamping operation is positioned above the layered material and the layered material rests on a platten against which the stamp 96 engages to form the front transverse valve seal 46, the perimeter seal 16 between the front 12 and back 14 balloon sheets, and to cut the finished product out of the raw material. The final stamping operation 94 preferably operates as frequently as the longitudinal edge sealer 68, the cutting operation 70, and the back valve seal 48 forming operation 78 to coordinate the flow of material through the manufacturing process. At the final stamping operation 94, an adequate seal is formed at 350 degrees Fahrenheit during the seal dwell time of 1.0 seconds, with a seal pressure of 50 PSI. This manufacturing method can be used to apply any of a variety of valve member seal shapes to valve members, form valve members, and to apply the valves to the balloons, in one manufacturing process.

The fact that the front transverse valve seal 46 and the back transverse valve 48 seal are capable of operating even when offset to the extent described above permits the separate forming of the front 46 and back 48 valve seals at different steps, and can tolerate some variance in relative positioning through the manufacturing process. This allows the manufacturing process to operate over a wider spectrum of alignment because the equipment does not have to be as precisely aligned, which alleviates certain manufacturing costs.

The presently preferred embodiment of the present invention, and a manufacturing method therefore, and many of its improvements, have been described with a degree of particularity. The previous description is a preferred example for implementing the invention, and the scope of the invention should not necessarily be limited by this description. The scope of the present invention is defined by the scope of the following claims.

What is claimed is:

1. A method for manufacturing a bag for containing a gas, the bag including a front sheet, a back sheet, and a stem, and including a valve having a front side and a back side, and defining a seal formed between the front sheet of the balloon and the front side of the seal, and between the back side of the valve and the back sheet of the balloon, the method comprising the steps of:

providing a double-wound roll of valve material;

providing a single-wound roll of back sheet material;

providing a single-wound roll of front sheet material;

forming longitudinal seals in said valve material to form individual valve members;

separating adjacent individual valve members;

spacing said adjacent individual valve members apart;

forming the seal between the back sheet material and the back side of the individual valve member;

applying the front sheet material to the combination of the valve member and the back sheet material;

forming a seal between the back sheet material and the front sheet material; and forming a seal between the front sheet material and the front side of the individual valve member.

2. The method of claim 1, wherein the seal formed between the back sheet material and the front sheet material forms a chamber with an exit defined only at the position of the valve.

3. The method of claim 2, wherein the formation of the seal between the front sheet material and the back sheet material and the seal between the front sheet material and the front side of the individual valve member occurs simultaneously.

4. The method of claim 2, wherein the adjacent individual valve members are spaced apart by approximately the width of an individual valve member.

5. The method of claim 2, wherein the double-wound valve material is stored on a roll having a brake actuable between a braking and a non-braking setting, and the valve material is received on a rotatable vacuum cylinder having a first variable vacuum chamber, and the step of spacing apart the individual valve members further comprises the steps of:

actuating the brake on the roll having the double-wound valve material to the braking setting;

advancing the vacuum cylinder to cause the vacuum cylinder to slip under the double wound valve material; and actuating the brake to the non-braking setting.

6. The method as defined in claim 5, further comprising the step of:

reducing the vacuum of the first vacuum chamber prior to the advancement of the vacuum chamber to allow the double-wound valve material to slip over the vacuum cylinder when the vacuum cylinder is advanced.

\* \* \* \* \*